No. 614,260. Patented Nov. 15, 1898.
J. CARUSO.
BICYCLE.
(Application filed May 21, 1897.)
(No Model.)
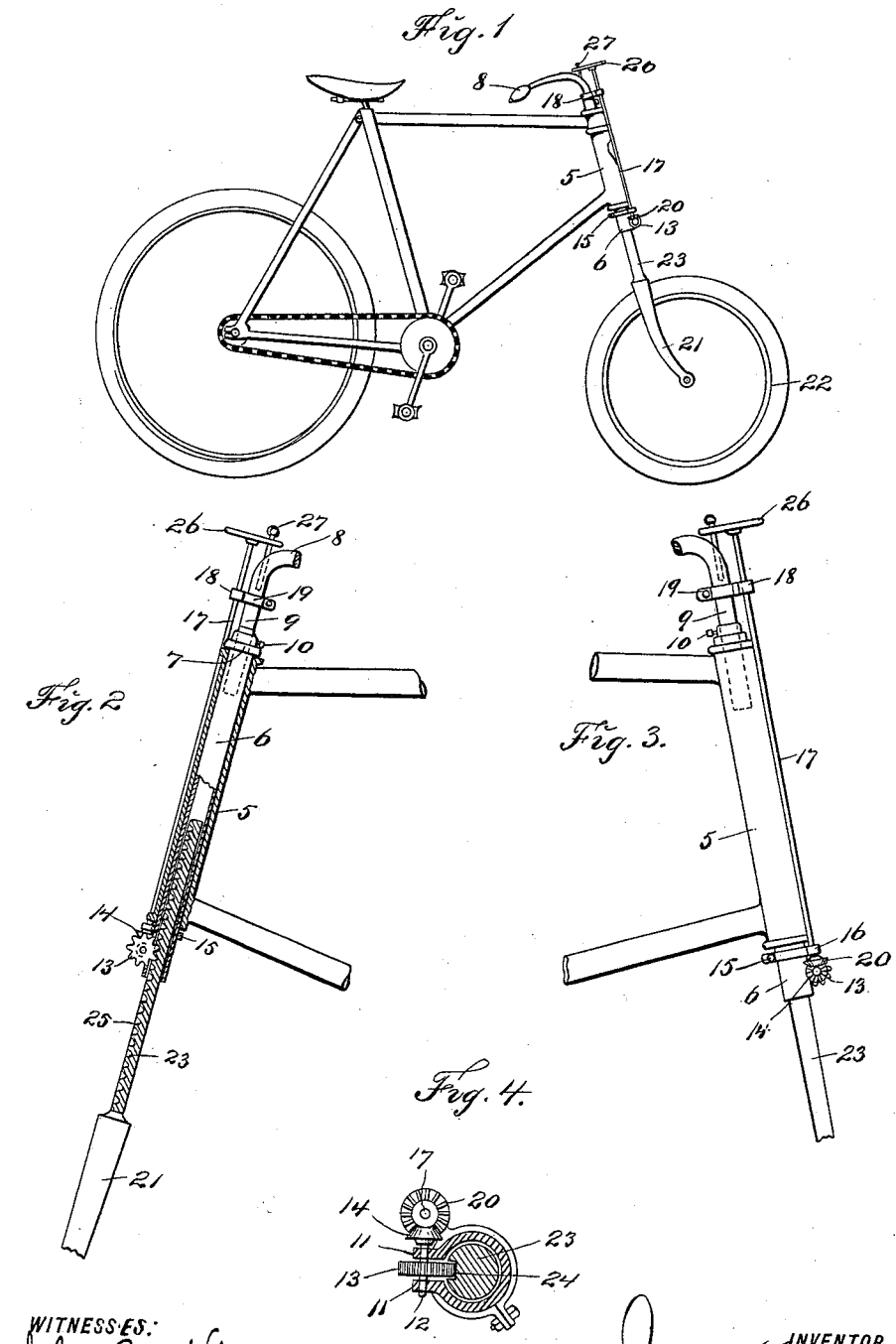

UNITED STATES PATENT OFFICE.

JOHN CARUSO, OF NEW YORK, N. Y.

BICYCLE.

SPECIFICATION forming part of Letters Patent No. 614,260, dated November 15, 1898.

Application filed May 21, 1897. Serial No. 637,523. (No model.)

*To all whom it may concern:*

Be it known that I, JOHN CARUSO, a subject of the King of Italy, residing at New York, (Brooklyn,) in the county of Kings and State of New York, have invented certain new and useful Improvements in Bicycles, of which the following is a full and complete specification, such as will enable those skilled in the art to which it appertains to make and use the same.

This invention relates to bicycles; and the object thereof is to provide a vehicle of this class the guide-wheel of which is adapted to be raised and lowered, so as to maintain the frame of the vehicle in a horizontal position when going up a hill or incline.

The invention is fully disclosed in the following specification, of which the accompanying drawings form a part, in which the separate parts of my improvement are designated by the same numerals of reference in each of the views, and in which—

Figure 1 is a side view of a bicycle constructed according to my invention; Fig. 2, a sectional side view of a part thereof, and Fig. 3 a side view of the part shown in Fig. 2. Fig. 4 is a cross-sectional view at the clamp 15 of Fig. 3.

In the drawings forming part of this specification I have shown in Fig. 1 a bicycle provided with what is known as a "diamond frame," and said frame is provided with the usual tubular head 5, through which the stem of the fork of the guide-wheel passes, and in the practice of my invention I provide a tube 6, which passes through the tubular head 5 and is adapted to turn therein, and said tube is provided at its upper end with a collar 7, and the handle-bar 8 is provided with a central downwardly-directed rod 9, which passes into the upper end of the tube 6 and which is adapted to be rigidly secured therein by a set-screw 10, or the rod 9 may be rigidly secured to the tube 6 in any desired manner or may consist of the extension thereof.

The lower end of the tube 6 is provided with forwardly-directed jaws 11, in which is mounted a shaft 12, which is provided with a ratchet or gear wheel 13 and at one end thereof with a beveled gear-wheel 14, and connected with the lower end of the tube 6 is a clamp 15, through which passes a rod provided with a bearing 16, through which passes a rod 17, the upper end of which also passes through a bearing 18, formed on a clamp 19, secured to the rod 9.

The lower end of the rod 17 is provided with a beveled gear-wheel 20, which operates in connection with the beveled gear-wheel 14 on the shaft 12, and the forward fork 21 of the bicycle, in which the guide-wheel 22 is mounted, is provided with a stem 23, which passes upwardly into the tube 6 and in the front of which is formed a vertical groove 24, which is provided with gear or ratchet teeth 25, in connection with which the gear or ratchet teeth 13 operate, and it will be apparent that by turning the rod 17 the forward fork, in which the guide-wheel is mounted, may be raised or lowered.

The rod 17 is provided at its upper end with a handle or ring 26, with which is connected a vertically-movable pin or bolt 27, which is adapted to pass into the handle-bar rod 9 or to operate in connection therewith or with the tube 6, so as to prevent the rod 17 from turning, and by means of this construction it will be seen that the tube 6 and the parts connected therewith, including the stem 23 of the forward fork 21 and the rod 17, may be turned by the handle-bar in the usual manner, so as to guide the vehicle, and that in thus turning the tube 6 the rod 17 turns around the tubular head 5 of the frame of the vehicle. It will also be apparent that by turning the rod 17 by means of the handle 26 the forward fork may be raised or lowered, as hereinbere described; but the stem of the forward fork cannot turn in the tube 6 by reason of the vertical groove 24 and the ratchet or gear wheel 13.

In my improved bicycle the guide-wheel 22 is made much smaller than the drive-wheel, and by reason of this fact and the construction hereinbefore described the guide-wheel may be raised or lowered, so as to maintain the frame of the vehicle in a horizontal position when going up a hill or incline, and this adjustment of the guide-wheel will facilitate the mounting of the inclines or hills, as will be readily understood, the power necessary in propelling the vehicle up the hill or incline being diminished and the position of the frame of the vehicle being such as to facilitate the operation of the propelling mechanism.

My improvement is simple in construction and operation and is perfectly adapted to accomplish the result for which it is intended, and it will be apparent that changes in and modifications of the construction herein described may be made without departing from the spirit of my invention or sacrificing its advantages.

Having fully described my invention, I claim as new and desire to secure by Letters Patent—

1. A bicycle, the frame of which is provided with the usual tubular head, and a revoluble tube mounted therein with which the handle-bar is connected, a guide-wheel which is smaller than the drive-wheel, and which is mounted in a fork provided with a stem which passes into said revoluble tube, and means for raising and lowering said stem and for preventing the same from turning in said tube, substantially as shown and described.

2. A bicycle, the frame of which is provided with the usual tubular head, and a revoluble tube mounted therein with which the handle-bar is connected, a guide-wheel which is smaller than the drive-wheel, and which is mounted in a fork provided with a stem which passes into said revoluble tube, and means for raising and lowering said stem and for preventing the same from turning in said tube, consisting of a groove formed in said stem, and provided with ratchet or gear teeth, a shaft connected with the lower end of said revoluble tube, and provided with a gear-wheel which operates in connection with said ratchet or gear teeth, and means for operating said shaft, substantially as shown and described.

3. A bicycle, the frame of which is provided with the usual tubular head and a tube which is mounted and adapted to turn therein, and with which the handle-bar is connected, said bicycle being also provided with a guide-wheel which is smaller than the drive-wheel, and which is mounted in a fork, the stem of which projects upwardly into said tube, said stem being provided in the front thereof, with a longitudinal groove in the bottom of which are formed ratchet or gear teeth, and said tube being provided at its lower end with a shank on which is mounted a wheel which operates in connection with said ratchet or gear teeth, a rod which is mounted in clamps secured to the upper and lower ends of said tube, and by means of which said shaft is operated, said rod being adapted to be turned in its supports, and means for preventing the turning of said rod, substantially as shown and described.

In testimony that I claim the foregoing as my invention I have signed my name, in presence of the subscribing witnesses, this 19th day of May, 1897.

JOHN CARUSO.

Witnesses:
C. GERST,
A. C. VAN BLARCOM.